United States Patent [19]
Kurtin et al.

[11] Patent Number: 5,371,629
[45] Date of Patent: Dec. 6, 1994

[54] NON-CIRCULAR VARIABLE FOCUS LENS

[76] Inventors: Stephen Kurtin, 3835 Kingswood Rd.; Saul Epstein, 14558 Deervale Pl., both of, Sherman Oaks, Calif. 91403

[21] Appl. No.: 13,436

[22] Filed: Feb. 4, 1993

[51] Int. Cl.⁵ .................. G02B 3/14; G02C 7/08
[52] U.S. Cl. ...................... 359/666; 351/41; 351/158
[58] Field of Search ............ 359/665, 666; 351/41, 351/158

[56] References Cited

U.S. PATENT DOCUMENTS

| | | | |
|---|---|---|---|
| 1,269,422 | 6/1918 | Gordon | 359/666 |
| 2,576,581 | 11/1951 | Edwards | 359/666 |
| 3,598,479 | 8/1971 | Wright | 359/666 |
| 4,181,408 | 1/1980 | Senders | 359/666 |
| 4,261,655 | 4/1981 | Honigsbaum | 359/666 |
| 4,403,840 | 9/1983 | Okun | 351/41 |
| 4,913,536 | 4/1990 | Barnea | 359/666 X |
| 5,124,734 | 6/1992 | Barnea | 359/666 |
| 5,138,494 | 8/1992 | Kurtin | 359/666 X |
| 5,182,585 | 1/1993 | Stoner | 359/666 |

*Primary Examiner*—Edward K. Look
*Assistant Examiner*—Michael S. Lee
*Attorney, Agent, or Firm*—Saul Epstein

[57] ABSTRACT

A non-circular variable focal length lens, for use in spectacles, which includes a rigid lens to provide the wearer's distance correction, and a liquid-filled lens bounded by a distensible stretched elastomeric membrane to provide a variable near addition. The liquid, which has a fixed volume, is stored in the field of view between the elastomeric membrane and the rigid lens. Variation of the optical power of the liquid filled lens is achieved by displacement of a membrane support to which the outer periphery of the stretched elastomeric membrane is attached. The shape of the distended membrane is kept substantially spherical, despite the circumference of the membrane being non-circular, by allowing the membrane support to bend in a predetermined controlled manner as it is moved.

10 Claims, 2 Drawing Sheets

NON-CIRCULAR VARIABLE FOCUS LENS

BACKGROUND OF THE INVENTION

This invention relates to variable focal length lenses. There is a need for such lenses as spectacle lenses because, as a result of aging, the lens in the human eye becomes incapable of sufficient accommodation to focus on near or intermediate objects. After the onset of the condition of limited focal accommodation, called presbyopia, a single set of fixed focus spectacles will be found to be unsatisfactory for both distant and near vision, irrespective of the wearer's general visual acuity. Whatever correction (if any) may be required to correct a person's vision for distance, an additional amount of optical power (up to about three diopters) will be found to be required to correct that person's eyesight for near vision. The required "near addition" generally does not involve an astigmatic component.

The usual solution to this problem is to fit persons suffering from presbyopia with spectacles having bifocal lenses. In the most common form of bifocal lens, the upper part is ground to provide the wearer with the proper correction (if any is needed) for distance vision, and the lower part is ground with the same correction plus a relatively small near addition. The near addition generally does not exceed a few diopters of optical power. Using bifocal lenses in a pair of spectacles allows a person to see distant objects clearly by looking straight ahead, and to see close objects clearly by looking downward.

The bifocal solution is not entirely satisfactory for at least three reasons. Firstly, many people have difficulty in adapting to bifocals; secondly, there is often the need to see near objects which are on a level with, or above, the wearer; and finally, there is usually a mid distance range within which which neither part of the lens is satisfactory. Trifocals or progressive multifocal lenses are used to help alleviate this last problem, but the first two difficulties remain, and in addition, the in-focus field of view may be more limited than is desired. The foregoing problem was addressed in a prior patent issued to one of the present inventors, U.S. Pat. No. 5,138,494. This patent discloses a continuously variable focus lens which can be adjusted by the wearer to focus on any object, irrespective of its distance from the wearer.

In the aforementioned prior patent, a liquid-filled variable focus lens was disclosed which includes a distensible transparent membrane spaced from a rigid lens, with the space between them filled with a liquid having a relatively high refractive index. The membrane is cemented to a membrane support (which is in the form of an annular rim), and the peripheries of the rigid lens and the membrane support are connected with a flexible sealing member. The rigid lens, the membrane, and the sealing member define a substantially fixed volume for the liquid filling. Changing the spacing between the membrane support and the rigid lens in such a structure causes the membrane to assume a curved form, either increasing the power of the lens or decreasing it, depending on the direction of the change in spacing. If the periphery of the membrane is circular, its shape, when distended, will be spherical, and no optical distortion will be encountered in use. However, one very substantial application of the lenses described in the previous patent is in variable focus spectacles where, for reasons of style, shapes other than circular are often desired. It has been found that in such cases, depending on the extent of the non-circularity of the lenses, the membrane shape may deviate significantly from the desired spherical shape, and greater than desired optical distortions may be encountered.

It is therefore an object of the present invention to enable the production of a liquid filled variable focal length lens wherein the optical distortion arising from non-circularity of the lens may be minimized.

SUMMARY OF THE INVENTION

The present invention uses a structure similar in many respects to the structure disclosed in the aforementioned '494 patent. Hence, the disclosures of U.S. Pat. No. 5,138,494 are incorporated herein by reference. In particular, the structures illustrated in FIGS. 5-9 of that patent are relevant hereto. The present invention relates to a structure similar to that shown in FIG. 9 of the prior invention, modified such that distortions which arise from the use of non-circular membranes are minimized. As was suggested above, the usual spectacle prescription for a person suffering from presbyopia (i.e., most people over the age of forty five) includes a basic correction to correct his or her vision at distance (including both spherical and astimatic corrections, if needed) plus an additional correction for close vision. The additional correction for close vision is almost always only spherical. Both the prior invention and the present invention basically involve means for providing the close vision correction by varying the spherical power of the lens. The present invention is an improvement over the previous invention in that it minimizes distortions which may arise from the shape of the lenses used.

As noted above, the '494 patent discloses a liquid filled variable focus lens in which a transparent membrane mounted on a membrane support is moved in such a way that the membrane distends to change the optical power of the lens. Also as noted above, depending on the shape of the periphery of the membrane, the distended surface may not be spherical. Hence, the present invention seeks to provide means to minimize any variation from sphericity (or other desired membrane shape) as the optical power is changed.

In the present invention, the annular rim of the membrane support is designed to flex in a controlled manner as it is moved so that, despite the use of a non-circular membrane, the membrane will maintain a substantially spherical shape as it distends, thereby permitting magnification changes without introducing undesirable amounts of distortion. In some cases, it may be desired to add some cylindrical magnification as well as spherical magnification as the optical power is changed. Proper control of the flexing of the membrane support can introduce cylindrical magnification into the lens system in addition to spherical magnification, if desired.

DETAILED DESCRIPTION OF THE INVENTION

Figure 1:
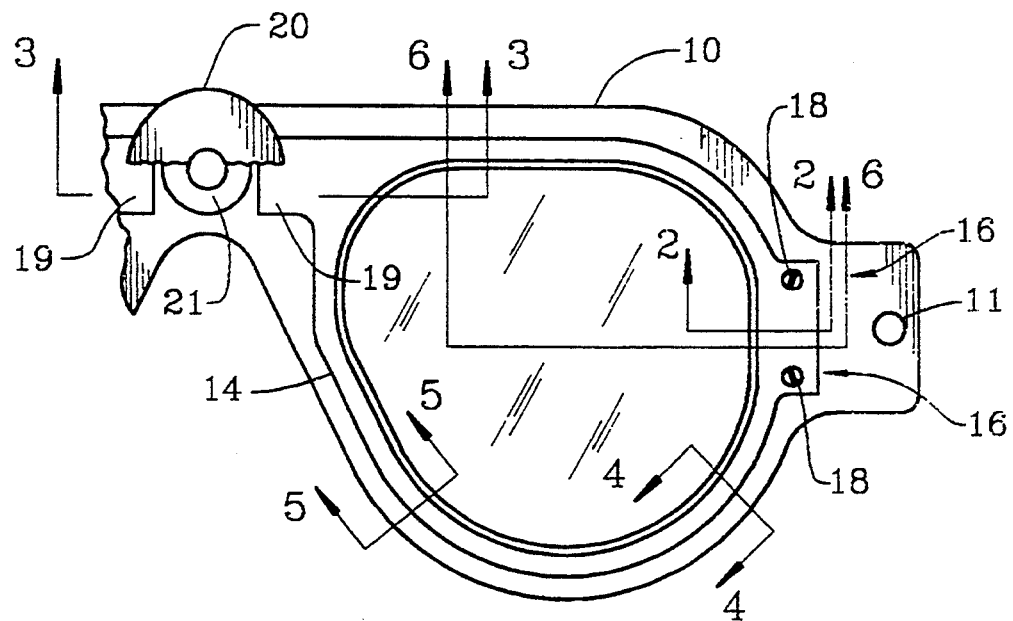
FIG. 1 is a rear view of a portion of a pair of spectacles using lenses according to the present invention. The view is from the wearer's side of the spectacles.

FIG. 1 depicts a pair of spectacles which include variable focus lenses according to the present invention. Only the right lens is shown (the view being from the wearer's side of the spectacles), plus a small portion of the left lens, sufficient to show the relationships between the parts. The following description will generally refer to only a single lens but, of course, it will be understood that there are actually two lenses in a pair of spectacles.

As seen in FIG. 1, the spectacles include a frame 10 to which temples (indicated schematically by the numeral 11) are attached. A rigid lens 12, preferably ground to fit the prescription of the wearer for distance viewing, is cemented in the frame 10. The rigid lens 12 is not visible in FIG. 1, but can be seen in FIGS. 2-6. A flexible seal 13 surrounds and is cemented or otherwise sealed to the rigid lens 12. Flexible seal 13 is also cemented or otherwise sealed to membrane support 14. Membrane support 14 is in the form of an annular rim having a non-circular opening through which the wearer looks, and to which membrane 15 is cemented. Membrane 15 can be cemented to the outboard surface (as shown) or the inboard suface of membrane support 14, as is convenient. It will be noted that the thickness of the membrane support (i.e., the dimension perpendicular to the page in FIG. 1) varies around the circumference of the membrane support (as can be seen by comparing the cross-sectional thickness as seen in FIGS. 2, 3, 4, 5, and 6. The purpose and effect of this thickness variation will be discussed below.

The membrane 15 is comprised of a thin transparent distensible plastic film such as saran. The enclosed volume defined by membrane 15, membrane support 14, seal 13, and rigid lens 12 is filled with a transparent liquid 21, which preferably has an index of refraction close to that of the rigid lens. Because of the proximity to the wearer's eyes, if the invented lens is used in connection with spectacles, the liquid should be one which will not harm the user's eyes if a leak occurs and some liquid comes into contact with the eyes.

Figure 2:
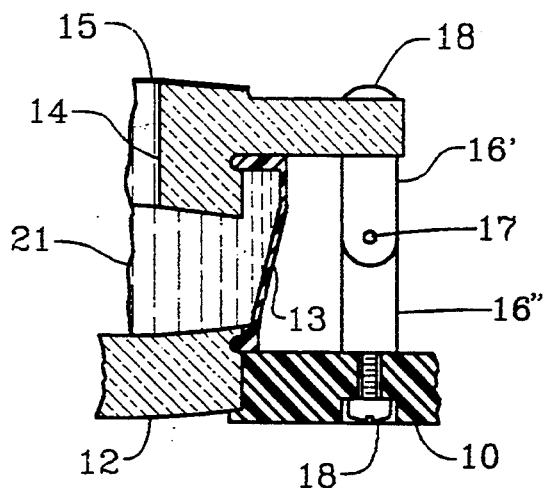
FIG. 2 is a cross sectional view of the lens shown in FIG. 1, taken at 2—2 of FIG. 1.
Figure 3:
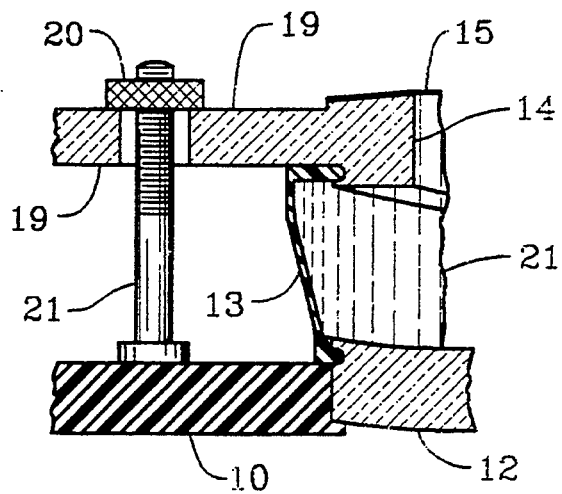
FIG. 3 is a cross sectional view of the lens shown in FIG. 1, taken at 3—3 of FIG. 1.
Figure 4:
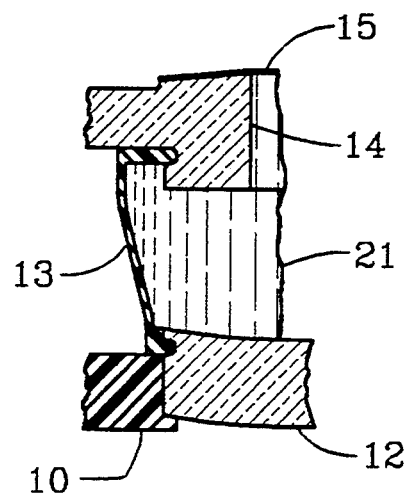
FIG. 4 is a cross sectional view of the lens shown in FIG. 1, taken at 4—4 of FIG. 1.
Figure 5:
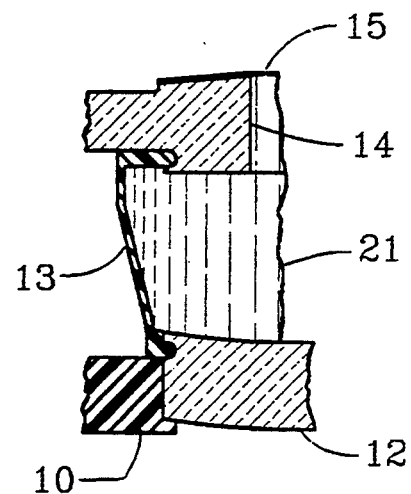
FIG. 5 is a cross sectional view of the lens shown In FIG. 1, taken at 5—5 of FIG. 1.
Figure 6:
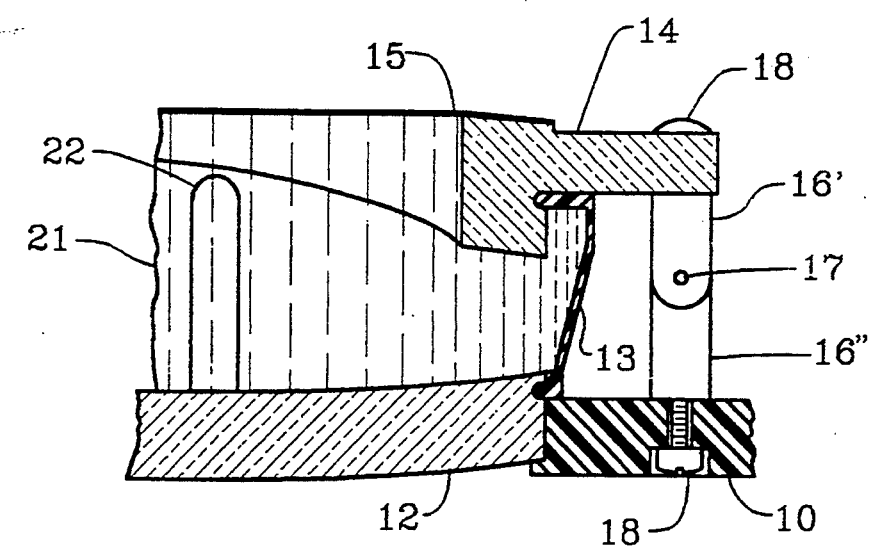
FIG. 6 is a cross sectional view of the lens shown an FIG. 1, taken at 6—6 of FIG. 1 showing an alternative constuction having a stop for selectively limiting the motion of the membrane support.

The membrane support 14 is attached to frame 10 via a pair of hinges 16, one of which can be seen in FIG. 2. Each of the hinges 16 is comprised of two hinge halves 16' and 16" which pivot around pin 17. The hinge halves 16' and 16" are fastened to the membrane support 14 and frame 10 by screws 18.

The membrane support 14 includes an actuating tab 19 extending outward from the support at a point remote from the hinges. The actuating tabs 19 from both lenses of the spectacles shown in FIG. 1 are engaged by a nut 20, which is threaded onto screw 21. For clarity, only a portion of the nut 20 is illustrated in FIG. 1. As nut 20 is turned (by the wearer's finger acting on the knurled circumference of the nut), the membrane supports rotate about the hinges 16. Since the liquid 21 is sensibly incompressible, membrane 15, the softest wall member, distends as needed to enclose a fixed volume. Flexible seal 13 is constructed so that the volume change due to its motion is relatively low.

Moving the tabs 19 toward the frame 10 causes the membranes 15 to bulge outward, resulting in an increased optical power. If the opening in the membrane support at the point of attachment of the membrane is circular, and the membrane support is rigid, the membrane will distend spherically, and no significant optical distortion will be introduced into the lens system. The optical power simply changes as the position of tabs 19 with respect to frame 10 changes. As the free circumference of the membrane deviates from circularity, however, the surface of the membrane when distended will deviate from being spherical, and distortions will appear in addition to changes in optical power.

Conceptually, if one were to project a non-round lens shade onto a sphere, one would note that the points on the circumference of the lens shape do not lie in a plane. The present inventors have realized that a spherical membrane shape can be achieved despite a non-round lens shape, if a membrane support were to be made which is planar when the membrane is flat, but which assumes the shape as would be found according to the experiment described in the previous sentence when the membrane support is deflected such that the membrane bulges sufficiently to provide the desired optical power. This is accomplished in the present invention by making the membrane support somewhat flexible so that it will bend in a predetermined manner as it is deflected. Inspection of FIGS. 2-6 will show that the cross sectional moment of inertia of the membrane support 14 about its neutral axis is not constant. As illustrated, it is greatest adjacent the hinges, and gets smaller toward tab 19. When tab 19 is pressed toward frame 10, the membrane support will not tilt as a plane, but will bend as it tilts, with the region near tab 19 bending the most. By properly proportioning the moment of inertia of the section of the membrane support around its circumference, the shape of the membrane support, when deflected, can be made such as to result in a substantially spherical membrane, despite the fact that the free membrane shape is not circular. The configuration of the membrane support required to result in the desired deformation for any particular lens shape can be calculated using the method of finite element analysis, or in other ways.

In some cases, merely varying the moment of inertia of the membrane support as described above may not be adequate to result in the desired shape of the support when deflected. Or, the needed variation of the moment of inertia may not, in a particular case, be practical—or even possible. In such cases, placing one or more stops 22 (which can be seen in FIG. 6) between the membrane support and the frame to limit the deflection of the membrane support at the location of the stop(s) can give further control of the deflected shape of the membrane support. The stop(s) 22, which are preferably attached to frame 10, may be located as needed around the circumference of the membrane support. They should be of such heights as to impede the travel of the membrane support as required to achieve a deflected membrane support shape which minimizes the undesired distortion of the membrane shape. The use of stop(s) 22 as described may be instead of, or in conjunction with, a varying moment of inertia of the membrane support. The stops used may be either rigid or resilient, or a combination, depending on the particular situation.

Depending on the amount and/or location of the deformation of the membrane support required to achieve a spherical membrane surface, it may be convenient to replace hinges 16 with rigid spacers. If the spacers are rigid, as for example, by fabricating them from metal, greater bending will take place in the membrane support, and a greater degree of non-circularity of the membrane can be accommodated.

What has been invented is a liquid filled variable focus lens wherein the distortions due to non-circularity of the lens are substantially reduced. Various modifications and adaptations of the invention will no doubt occur to those skilled in the art. Such modifications and adaptations as are within the terms and spirit of the following claims are intended to be covered thereby.

We claim:

1. A variable focal length lens which comprises:
    a rigid lens;
    a membrane support comprised of an annular rim spaced from said rigid lens;
    a transparent membrane positioned across the field of view of said rigid lens and sealed around its periphery to said membrane support;
    a transparent liquid filling the space between said rigid lens and said membrane;
    flexible sealing means for retaining said transparent liquid between said rigid lens and said membrane;
    fixed spacing means for maintaining a substantially constant spacing between said rigid lens and said membrane support at at least one point around the circumference of said membrane support; and
    variable spacing means acting between said rigid lens and said membrane support for adjusting the spacing between said membrane support and said rigid lens at the location of said variable spacing means,
    the moment of inertia of the rim of said membrane support about its neutral axis being of such value and being so proportioned around the circumference of said membrane support whereby said membrane support will deform as to cause the surface of said membrane to assume a desired shape when said variable spacing means is adjusted.

2. A variable focus lens as recited in claim 1 wherein said fixed spacing means hingedly connects said membrane support to said frame.

3. A variable focus lens as recited in claim 2 and further including one or more stopping means for impeding the motion of said membrane support at one or more selected places around the circumference of said membrane support.

4. A variable focus lens as recited in claim 1 wherein said fixed spacing means rigidly connects said membrane support to said frame.

5. A variable focus lens as recited in claim 4 and further including one or more stopping means for impeding the motion of said membrane support at one or more selected places around the circumference of said membrane support.

6. A variable focus lens as recited in claim 1 wherein said desired shape is spherical.

7. A variable focus lens as recited in claim 6 wherein said fixed spacing means hingedly connects said membrane support to said frame.

8. A variable focus lens as recited in claim 7 and further including one or more stopping means for impeding the motion of said membrane support at one or more selected places around the circumference of said membrane support.

9. A variable focus lens as recited in claim 6 wherein said fixed spacing means rigidly connects said membrane support to said frame.

10. A variable focus lens as recited in claim 9 and further including one or more stopping means for impeding the motion of said membrane support at one or more selected places around the circumference of said membrane support.

* * * * *